(12) United States Patent
Tan et al.

(10) Patent No.: US 8,611,031 B1
(45) Date of Patent: Dec. 17, 2013

(54) METHODS AND DEVICES FOR ADAPTIVE MARGINING

(75) Inventors: Christopher John B. Tan, Petaling Jaya (MY); Brent R. Dichoso, Petaling Jaya (MY); Tom Takan, Kwaeng Saimai (TH); Kamalam P. Elayappan, Setia Alam (MY); Theivarayan Prakash Somasundaram, Petaling Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/587,650

(22) Filed: Aug. 16, 2012

(51) Int. Cl.
*G11B 5/02* (2006.01)

(52) U.S. Cl.
USPC .......................................................... 360/25

(58) Field of Classification Search
None
See application file for complete search history.

(56) References Cited

U.S. PATENT DOCUMENTS

| | | | |
|---|---|---|---|
| 5,442,638 A * | 8/1995 | Awad et al. | 360/31 |
| 5,537,034 A | 7/1996 | Lewis | |
| 5,666,237 A | 9/1997 | Lewis | |
| 5,870,241 A | 2/1999 | Ottesen et al. | |
| 5,898,535 A | 4/1999 | Kawai | |
| 5,917,670 A | 6/1999 | Scaramuzzo et al. | |
| 6,034,831 A | 3/2000 | Dobbek et al. | |
| 6,052,804 A | 4/2000 | Thowe et al. | |
| 6,223,303 B1 | 4/2001 | Billings et al. | |
| 6,281,676 B1 * | 8/2001 | Ottesen et al. | 360/25 |
| 6,490,691 B1 | 12/2002 | Kimura et al. | |
| 6,504,662 B2 | 1/2003 | Sobey | |
| 6,552,880 B1 | 4/2003 | Dunbar et al. | |
| 6,567,229 B1 | 5/2003 | Mallary et al. | |
| 6,654,904 B1 | 11/2003 | Andoh et al. | |
| 6,985,319 B2 | 1/2006 | Yip et al. | |
| 7,032,127 B1 * | 4/2006 | Egan et al. | 360/53 |
| 7,139,145 B1 | 11/2006 | Archibald et al. | |
| 7,251,908 B2 | 8/2007 | Yori | |
| 7,457,069 B2 | 11/2008 | Yoshioka et al. | |
| 7,583,461 B2 | 9/2009 | Kudoh et al. | |
| 7,656,763 B1 | 2/2010 | Jin et al. | |
| 7,688,540 B1 | 3/2010 | Mei et al. | |
| 7,800,858 B1 | 9/2010 | Bajikar et al. | |
| 7,804,661 B2 | 9/2010 | Wilcox et al. | |
| 7,982,993 B1 | 7/2011 | Tsai et al. | |
| 8,014,245 B2 * | 9/2011 | Chen et al. | 369/53.17 |
| 8,194,338 B1 * | 6/2012 | Zhang | 360/31 |
| 2001/0048567 A1 | 12/2001 | Chng et al. | |
| 2002/0036858 A1 * | 3/2002 | Bi et al. | 360/75 |
| 2002/0091964 A1 * | 7/2002 | Cheok et al. | 714/6 |
| 2004/0190185 A1 * | 9/2004 | Lee | 360/75 |
| 2007/0146921 A1 * | 6/2007 | Jun | 360/53 |
| 2007/0153656 A1 * | 7/2007 | Mahr et al. | 369/53.12 |
| 2009/0052289 A1 * | 2/2009 | Chen et al. | 369/53.17 |
| 2012/0092975 A1 * | 4/2012 | Jun | 369/47.14 |
| 2012/0327533 A1 | 12/2012 | Selvaraj | |

* cited by examiner

Primary Examiner — Thang Tran

(57) ABSTRACT

A data storage device may comprise a disk comprising a plurality of zones, each comprising a plurality of data tracks, a head having a reader spaced away from a writer by a gap, and a controller. The controller may be configured to, upon detecting a media defect in one of the zones: determine a width of data tracks in the zone in which the media defect is detected; calculate a minimum number of contiguous tracks in the zone in which the media defect is detected whose aggregate width is at least as great as the gap between the reader and writer; and margin the detected media defect with a number of tracks immediately adjacent to the detected media defect that is at least equal to the calculated minimum number of contiguous tracks.

18 Claims, 5 Drawing Sheets

METHODS AND DEVICES FOR ADAPTIVE MARGINING

BACKGROUND

In disk drives, defects on the media surface can cause the read channel to repeatedly detect incorrect data (hard errors). Very large defects may result in hard errors that are too long for the disk drive ECC algorithm to detect. Defect scans are used in the manufacturing process to flag those sectors with large defects so they are excluded from use during normal drive operation. The defect scan may comprise two main steps:
1. Write entire media surface with a high frequency repeating patterns;
2. Read back each sector and check for unusual changes in head signal amplitude.

A high frequency pattern is written to maximize the probability of actually writing a transition on a small defect. If a transition is written on a defect, the resulting magnetic head amplitude increases or decreases based on the type of defect. A decrease in magnetic material on the media correspondingly decreases the amplitude of the read back signal (resulting in a localized read back signal drop-out) and an increase in magnetic material on the media correspondingly increases the amplitude of the read back signal (resulting in a localized read back signal drop-in).

Based upon the number of detected defects, it may be determined whether the disk drive is useable or not. The disk drive may fail the manufacturing process when too many defects are detected. Conventionally, if the disk drive is determined to be usable given the number and severity of the detected defects, a predetermined space around the detected defect is designated as a margin that becomes unavailable for user data. However, experience has shown that a detected defect may spread or "grow" from its original position during subsequent use of the disk drive. Such defects are commonly known as thermal asperities (TA) and often manifest themselves outside of the predetermined margins designated around the detected media defect. In some cases, the disk drive may ultimately fail in the hands of the end user, due to such grown defects. Conventionally, disk drives use a fixed number of sectors or tracks to margin TAs. As a result, the disk drive may either under margin or over margin the TA. If the disk drive under margins the TA by designating too few sectors and/or tracks around a TA as margin and thus unavailable for storage and retrieval of user data, the disk drive becomes prone to head and media collisions, which damage and degrade the performance of the head. If the drive over margins a TA by designating a greater number of sectors or tracks than necessary, the drive may not meet the target capacity.

DETAILED DESCRIPTION

Figure 1:
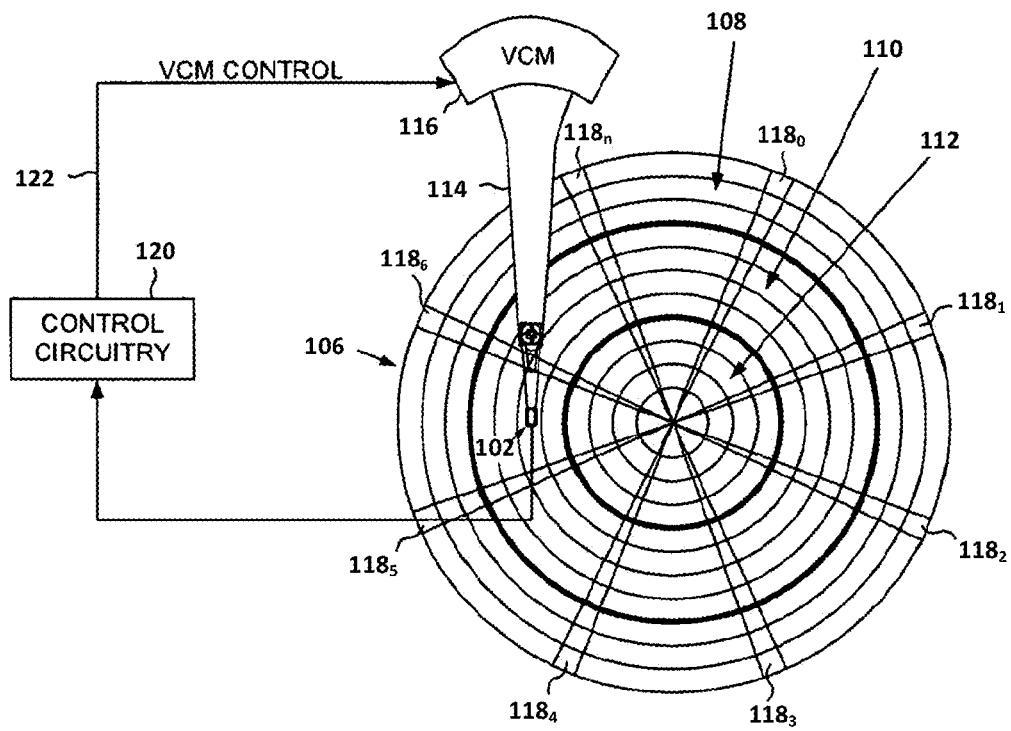
FIG. 1 shows a disk drive according to one embodiment.

FIG. 1 shows a disk drive, according to one embodiment. A head 102 may be actuated over a disk surface 106, and the disk surface 106 may comprise a plurality of servo tracks and a plurality of data tracks. As shown, the data tracks of the disk surface may be banded together into a plurality of physical zones, each zone having physical zone boundaries at predetermined radial locations on the disk surface, wherein each physical zone is operable to store data in the data sectors at a predetermined data rate. That is, the data tracks of the disk surface 106 may be banded together into a plurality of zones, including a first outer diameter (OD) zone 108, a second middle diameter (MD) zone 110 and a third inner diameter (ID) zone 112. The number of servo tracks per inch (STPI) may be fixed across the first zone 108, the second zone 110 and the third zone 112. The number of data tracks per inch (DTPI), however, may not be fixed. That is, each of the three zones 108, 110 and 112 may comprise a respective DTPI, with the DTPI of each zone being different from the DTPI of the other zones.

Although not shown in FIG. 1, the disk drive may comprise a plurality of heads such as head 102, each actuated over a respective disk surface 106. The heads are attached to the distal ends of actuator arms 114, which are rotated about a pivot by a voice coil motor (VCM) 116 in order to position the heads over the disk surfaces. Each disk surface, such as disk surface 106, may comprise a number of servo sectors ($118_0$-$118_n$) that store coarse head position information (e.g., a track address) used to position the head over a target data track during a seek operation, and fine head position information (e.g., servo bursts) used to maintain the head over the target data track during read/write operations. The control circuitry 120 may process the servo sectors ($118_0$-$118_n$) to generate a VCM control signal 122 applied to the VCM 116 in a closed loop servo system. Each zone 108, 110, 112 may comprise the same integer number of servo tracks and a different number of data tracks.

The heads of a disk drive may comprise a write element for writing information and a separate read element for reading information on the disks. The read element and the write element of the heads may be spaced apart from one another by a gap. Therefore, the read element may be offset from the write element relative to the center of a track. Consequently, centering the read element on a selected data track will not necessarily center the write element over the selected data track and vice versa. Moreover, the offset will may vary for different radial positions of the disks.

The geometry of the write element of the head may impact the disk drive's ability to reliably recover written data, particularly toward the outer and inner diameter of the disk where the angle the head makes with the data tracks increases (the head skew angle). For example, in disk drives employing perpendicular magnetic recording, the width of the magnetic footprint generated by the write element may increase due to the head skew angle. The skew angle may be greater at the OD and ID of the disk than it is toward the middle of the disk, between the disk ID and OD. Because of this skew angle and in order to reduce the amount of adjacent track erasure, the DTPI may be adjusted across the radius of the disk, from zone to zone, so that the track width of the data tracks is increased toward the outer and inner diameter of the disk. Selecting the optimal TPI that minimizes adjacent track erasure while achieving a desirably high radial density depends on the actual geometry of the write element.

Figure 2:
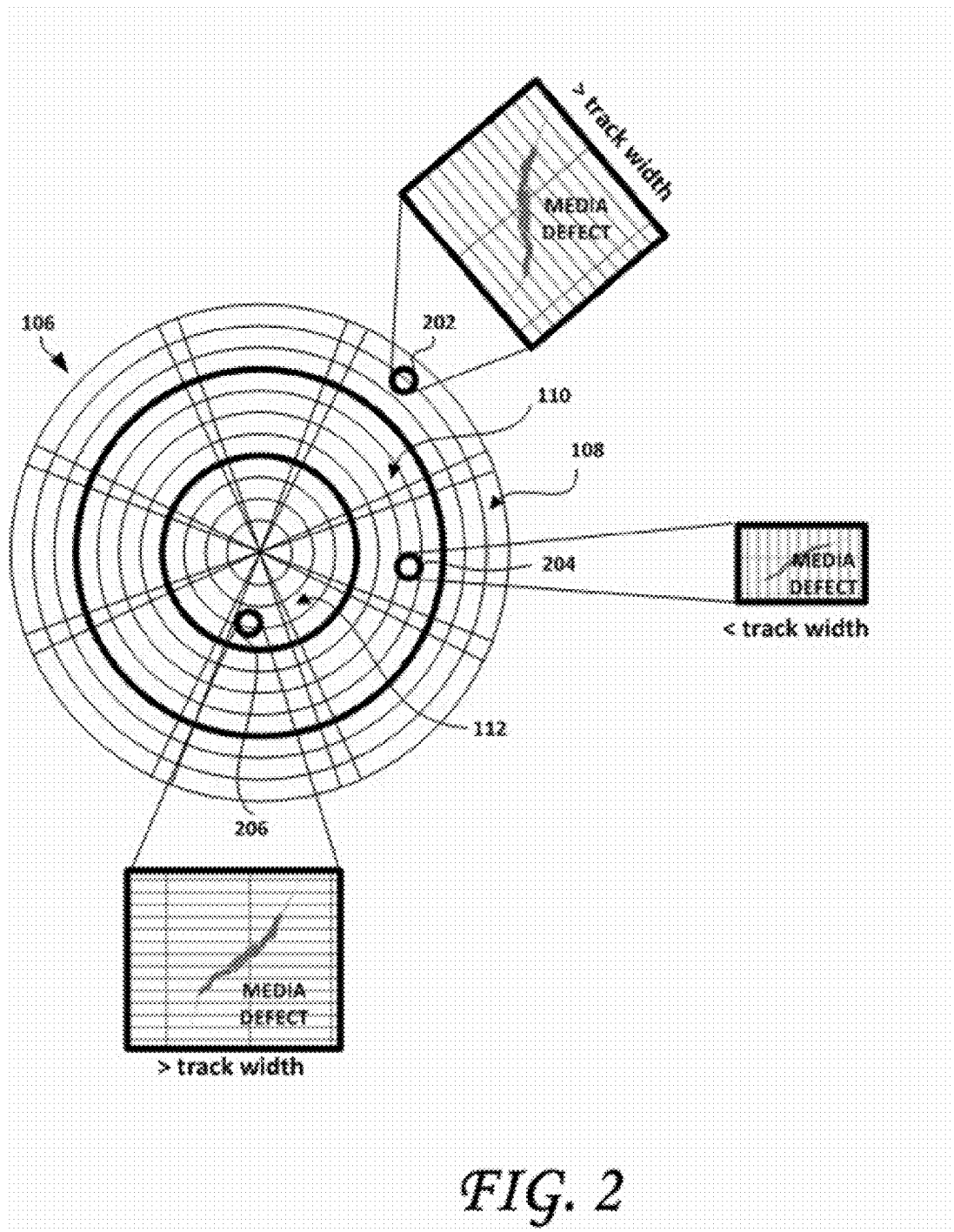
FIG. 2 shows a disk surface, in which the track width varies from zone to zone.

FIG. 2 shows a disk surface, in which the data track width varies from zone to zone. As shown, the disk surface 106 may be formatted to comprise, for example, three zones, an outer diameter (OD) zone 108, a middle diameter (MD) zone 110 and an inner diameter (ID) zone 112. It is to be understood that the disk surface may be formatted to comprise a greater number of zones. For purposes of illustration, the disk surface 106 comprises three TAs; namely, TA 202 within the ID zone 108, TA 204 within the MD zone 110 and TA 206 within the ID zone 112. As shown, the width of the data tracks within the MD zone 110 may be comparatively smaller than the width of the data tracks within the ID zone 112 and/or the OD zone 108. According to one embodiment, protecting the head from TA 204 in the MD zone 110 may require a different number of data tracks to be margined than protecting the head from TA 202 in the OD zone 108 and/or from TA 206 in the ID zone 112. For example, protecting the head from TA 204 may require a greater number of relatively narrower data tracks than would be required to protect the head from TA 202 or TA 206, given the relatively wider data tracks in zones 108 and 112, respectively. That is, to keep a 2 μin margin around TA 202 may require a greater number of narrower data tracks than would be required to keep the same 2 μin margin around either TA 202 or TA 206, as these TAs are located in zones where the data track widths are comparatively wider. The 2 μin is given as an example only and the actual margin may be different based on the geometry and/or dimensions of the head used in a particular drive.

Accordingly, the margining of disk defects may be carried out adaptively, depending upon the width of the data tracks in the zone in which the media defect is detected. Therefore, according to one embodiment, upon detecting a media defect such as a TA, a determination may be made as to the width of data tracks in the zone in which the media defect is detected. Thereafter, based upon this determined width, the minimum number of contiguous tracks whose aggregate width is at least as great as the gap between the reader and writer of the head may then be calculated. For example, if the media defect is located in a zone whose data tracks are comparatively narrow relative to the width of data tracks in other zones, a greater number of contiguous data tracks may be required to be margined, such that the aggregate width thereof is at least as great as the gap between the reader and the writer of the head. Accordingly, the detected media defect may then be margined with a number of tracks immediately adjacent to the detected media defect that is at least equal to the calculated minimum number of contiguous tracks. That is, in addition to the track or tracks in which the media defect is detected, one embodiment calls for the detected media defect to be margined with a sufficient number of contiguous tracks such that neither the reader nor the writer of the head risks coming into contact with the media defect or its immediate vicinity. Toward that end, the detected media defect may be margined at the ID side and at the OD side thereof with a number of data tracks immediately adjacent to the detected media defect that is at least equal to the calculated minimum number of contiguous data tracks whose aggregate width is at least as great as the gap between the reader and writer of the head. According to one embodiment, that minimum number of data tracks may be a greater number if the detected media defect is located within the MD zone 110 than if the detected media defect were located at the ID and/or OD zones 108, 112. Note also that this minimum number of data tracks may be influenced by the head skew of the head at the ID and at the OD. Indeed, the angle at which the reader and writer of the head present relative to the tracks (the head skew angle) is greater at the ID and OD than it is toward the center of the disk, at and around the MD.

The TPI of the data tracks differs from the TPI of the servo tracks over at least part of the disk surface. The centerline of each data track is defined relative to the servo tracks, for example, relative to an offset from the centerline of each servo track, in which the offset is adjusted in order to adjust the TPI of the data tracks. In one embodiment, once a data track TPI has been selected for a zone of the disk (in which a zone comprises a predetermined number of data tracks), the width of the data tracks may be calculated and the minimum number of data tracks for margining purposes may be calculated.

Figure 3:
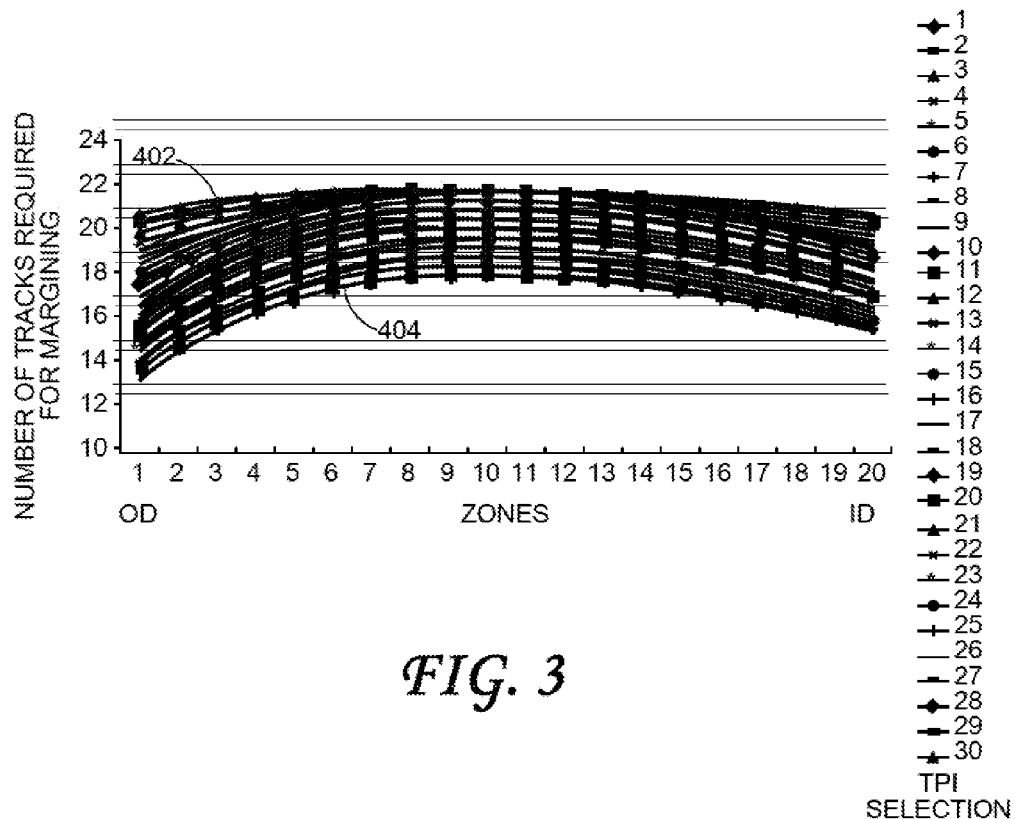
FIG. 3 shows a graph detailing a number of tracks per 2 μm, per zone and per TPI selection.

FIG. 3 shows a graph detailing how the number of tracks per 2 μm, per zone and per TPI selection varies across the different zones of the disk surface. As shown therein, 20 zones are shown on the X-axis and the number of contiguous tracks required to span a width of 2 μm are shown on the Y-axis. The data for a total of 30 TPI selections are shown. The data toward the top (402) shows the number of data tracks required to margin a detected media defect with 2 μm of margin if the storage device is configured with the highest TPI selection, which corresponds with the smallest width of the data tracks. The data toward the bottom (404) shows the number of data tracks required to margin a detected media defect with 2 μm of margin if the storage device is configured with the lowest TPI selection, which corresponds with the greatest width of the data tracks.

Figure 4:
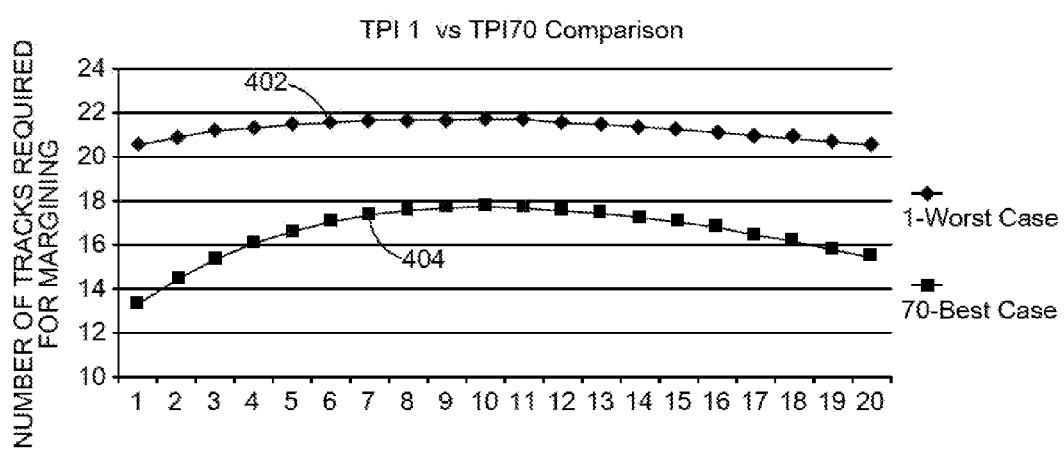
FIG. 4 is a graph showing the thinnest and thickest data tracks of the graph of FIG. 3.

FIG. 4 shows a graph detailing the data for the first and last TPI selections of FIG. 3. Curve 402 shows the number of contiguous tracks required to collectively make up an aggregate width of at least 2 μm across zones 1-20 when the first TPI is selected and curve 404 shows the number of contiguous tracks required to collectively make up an aggregate width of at least 2 μm across zones 1-20 when the last TPI is selected. As shown at 402, toward the OD and ID, about 21 tracks are required at 402 and about 22 tracks toward the MD. This data corresponds to a first (high) TPI selection and data tracks having a relatively small width. Conversely, as shown at 404, toward the OD, about 13 tracks are required, about 16 tracks are required at the ID and about 18 tracks are required at the MD. This data corresponds to a last (low) TPI selection and data tracks having a relatively large width.

Accordingly, depending upon the TPI selection and the absolute margin dimension, which depends on head dimension, the number of tracks required to margin a detected media defect with 2 μm of margined tracks may vary depending upon the location of the detected media defect (e.g., in which zone the detected media defect is detected). Compared to using a fixed number of tracks, calculating the minimum number of contiguous tracks in the zone in which the media defect is detected whose aggregate width is at least as great as the gap between the reader and writer of the head can save a number of tracks from being utilized for margining purposes, which tracks may then safely be made available for storing user data. For example, as shown at 404 in FIG. 4, up to 18 contiguous data tracks would be required to collectively make up a 2 μm margin. If such 18 data tracks margin were applied across all zones, from the OD to the MD to the ID, up to 5 data tracks would be utilized at the OD that need not be so utilized as margin. Indeed, the difference of 18 tracks at the MD and about 13 tracks at the OD, as shown at 404, results in a savings of about 5 data tracks. Similarly, at the ID, only about 15 tracks are necessary, compared to about 18 at the MD, resulting in a potential savings of 3 tracks at the ID. Therefore, significant savings may be derived from margining a detected media defect with a number of tracks immediately adjacent to the detected media defect that is at least equal to the calculated minimum number of contiguous tracks. The greatest savings of tracks during margining procedures may, therefore, be realized when margining media defects located near the ID and the OD of the disk, compared to a fixed track number margining scheme based upon the track width at the MD.

Figure 5:
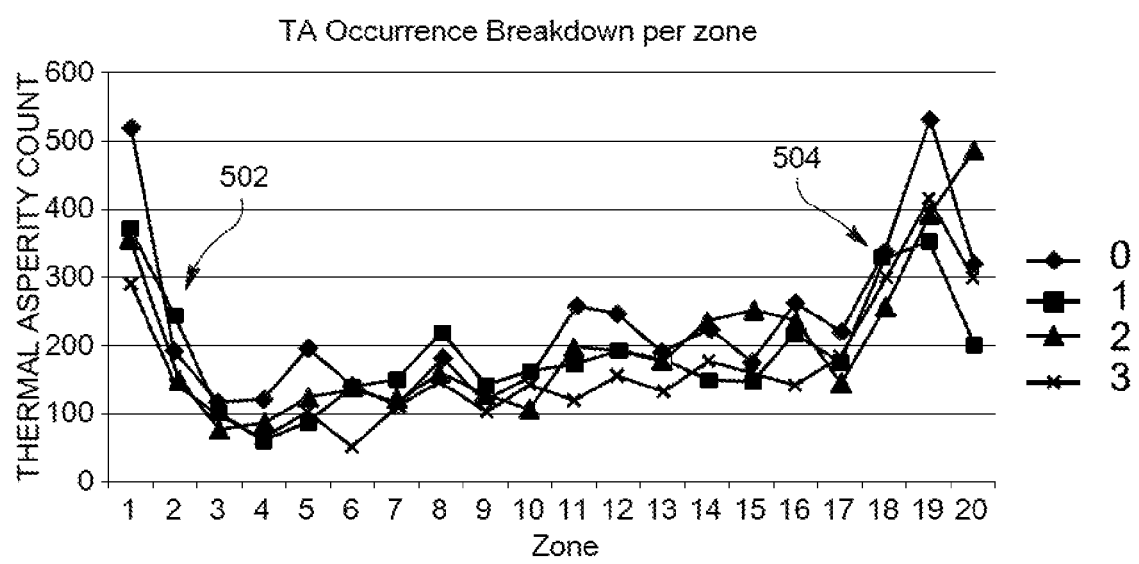
FIG. 5 shows the frequency of occurrence of media defects per zone.

FIG. 5 shows the frequency of occurrence of media defects per zone, based on data acquired from the Initial-Burn-In (IBI) log files of 331 disk drives. The data of FIG. 5 shows that the greatest number of media defects occur toward the OD (around zones 1 and 2), as shown at 502 and toward the ID (around zones 19 and 20), as shown at 504. Therefore, since the width of data tracks toward the OD and toward the ID tends to be greater than the width of data tracks toward the MD, a lesser number of data tracks may be required to margin media defects detected in those zones. Compared to a margining scheme calling for a fixed number of tracks, utilizing fewer data tracks for margining purposes at the OD and ID, where most of the media defects are detected, results in a significant savings of data tracks, which data tracks may be used for storing user data, instead of being used for margining purposes. Saving data tracks also means that less data need be relocated to the spare locations on the disk drive, resulting in a further savings of tracks.

According to one embodiment, to determine the width of data tracks in the zone in which the media defect is detected, a calculation may be carried out. Such a calculation may comprise multiplying the servo tracks per inch (STPI) amount by a ratio of (1) a number of data tracks per cluster (DTPC) in the zone in which the media defect is detected to (2) a number of servo tracks per cluster (STPC) in the zone in which the media defect is detected, and converting the result to a number of data tracks per nanometer (nm). The width of the data tracks within the zone (in nm) in which the media defect was detected may then be calculated as the reciprocal of the number of data tracks per nanometer.

For example, in a zone comprising 139 data tracks per cluster, 128 servo tracks per cluster and 235,000 STPI, the width of the data track may be calculated as follows:

$$235{,}000 \text{ STPI} \times (139 \text{ DTPC}/128 \text{ STPC}) \times (1 \text{ in}/2.54 \text{ cm}) \times (1 \text{ cm}/10{,}000 \text{ micrometers}) = 10.04705955 \text{ data tracks/nm}.$$

Therefore, the width of the data track is 1/10.04705955 or 0.099531609 nm per data track. The number of tracks to be margined can now be calculated by dividing the pre-determined absolute margin width (based on head dimension) by this calculated data track width.

Figure 6:
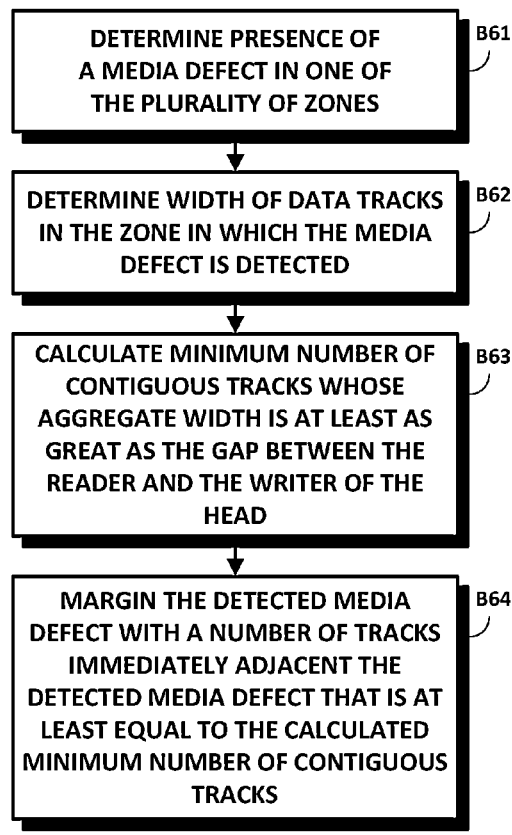
FIG. 6 is a flowchart for a method of operating a storage device such as a disk drive, the storage device comprising a disk comprising a plurality of zones, according to one embodiment.

FIG. 6 is a flowchart for a method of operating a storage device, the storage device comprising a disk comprising a plurality of zones, according to one embodiment. As shown at Block B61, the presence of a media defect (e.g., a TA or a scratch) may be determined in one of the plurality of zones, such as zones 108, 110 and 112 in FIGS. 1 and 2 or 1-20 in FIGS. 3-5. Block B62 calls for the determination of the width of data tracks in the zone in which the media defect is detected. The calculation may be carried out, for example, as outlined above. Then, the minimum number of contiguous data tracks whose aggregate width is at least as great as the gap between the reader and the writer of the head may then be calculated, as shown at B63. Lastly, Block B64 calls for the detected media defect to be margined with a number of data tracks immediately adjacent the detected media defect that is at least equal to the calculated minimum number of contiguous data tracks.

Figure 7:
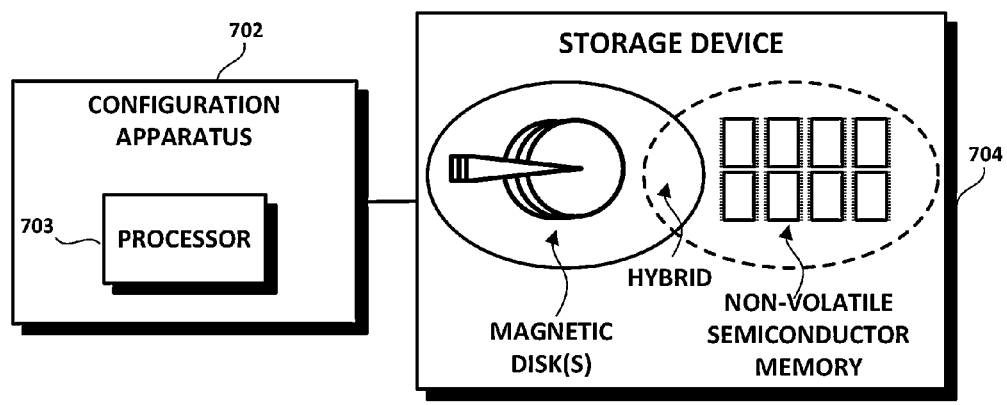
FIG. 7 is a diagram of a configuration apparatus coupled to a storage device, according to one embodiment.

FIG. 7 is a diagram of a configuration apparatus coupled to a storage device, according to one embodiment. The configuration apparatus is shown at 702 and the storage device is shown at reference 704. The storage device 704 may comprise one or more magnetic disks that may comprise one or more media defects thereon. The storage device 704 may also be a hybrid drive, comprising both magnetic disk(s) and an array of non-volatile semiconductor memory modules. The testing apparatus 702 comprise a processor 703 that, according to one embodiment, may be configured and/or programmed to carry out the functionality of one or more of the Blocks B61-B64 shown in FIG. 6 and/or any of the functionality described and shown herein. For example, the testing apparatus 702 may carry out the functionality of Blocks B61, B62 and B63 and the storage device 704 coupled thereto may carry out (or be controlled by the configuration apparatus 702 to carry out) the functionality of Block B64. Other permutations are possible, as those of skill in this art may recognize.

Advantageously, data tracks that would otherwise be utilized for margining purposes may now be used for user data. Moreover, the spare locations on the drive where the data stored on data tracks that would otherwise be used for margining purposes may now kept as spare tracks, increasing the drive's ability to thereafter relocate the data stored on defective physical locations. The head reliability is increased, as the head is less likely to suffer a collision with under-margined media defects.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the inventions. For example, those skilled in the art will appreciate that in various embodiments, the actual structures may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device, comprising
a disk comprising a plurality of zones, each of the plurality of zones comprising a plurality of data tracks;
a head comprising a reader to read data from the disk and a writer to write data to the disk, the reader being spaced away from the writer to define a gap therebetween; and
a controller configured to, upon detecting a media defect in one of the plurality of zones:
determine a width of data tracks in the zone in which the media defect is detected;

calculate a minimum number of contiguous tracks in the zone in which the media defect is detected whose aggregate width is at least as great as the gap between the reader and writer of the head; and margin the detected media defect with a number of tracks immediately adjacent to the detected media defect that is at least equal to the calculated minimum number of contiguous tracks.

2. The data storage device of claim 1, wherein the controller is further configured to margin the detected media defect with the calculated minimum number of contiguous tracks on both an (ID) side and on an (OD) side of the detected media defect.

3. The data storage device of claim 1, wherein the controller is further configured to relocate data stored on the margined tracks to a spare location on the data storage device.

4. The data storage device of claim 1, wherein the controller is configured to determine the width of the data tracks in the zone in which the media defect is detected by:

multiplying a servo tracks per inch (STPI) amount by a ratio of (1) a number of data tracks per cluster (DTPC) in the zone in which the media defect is detected to (2) number of servo tracks per cluster (STPC) in the zone in which the media defect is detected.

5. The data storage device of claim 1, wherein the media defect comprises a thermal asperity (TA).

6. The data storage device of claim 1, wherein the media defect comprises a scratch.

7. A method of operating a storage device, the storage device comprising a disk comprising a plurality of zones, each of the plurality of zones comprising a plurality of tracks; a head comprising a reader to read data from the disk and a writer to write data to the disk, the reader being spaced away from the writer to define a gap therebetween, the method comprising:

determining a presence of a media defect in one of the plurality of zones:

determining a width of data tracks in the zone in which the media defect is detected;

calculating a minimum number of contiguous tracks whose aggregate width is at least as great as the gap between the reader and writer of the head; and margining the detected media defect with a number of tracks immediately adjacent to the detected media defect that is at least equal to the calculated minimum number of contiguous tracks.

8. The method of claim 7, further comprising margining the detected media defect with the calculated minimum number of contiguous tracks on both an (ID) side and on an (OD) side of the detected media defect.

9. The method of claim 7, further comprising relocating data stored on the margined tracks to a spare location on the data storage device.

10. The method of claim 7, wherein determining the width of data tracks in the zone in which the media defect is detected comprises multiplying a servo tracks per inch (STPI) amount by a ratio of (1) a number of data tracks per cluster (DTPC) in the zone in which the media defect is detected to (2) a number of servo tracks per cluster (STPC) in the zone in which the media defect is detected.

11. The method of claim 7, wherein determining the presence of the media defect comprises determining a presence of a thermal asperity (TA).

12. The method of claim 7, wherein determining the presence of the media defect comprises determining a presence of a scratch.

13. A configuration apparatus coupled to a storage device, the storage device comprising a disk and a head, the disk comprising a plurality of zones each comprising a plurality of data tracks, the head comprising a reader to read data from the disk and a writer to write data to the disk, the reader being spaced away from the writer to define a gap therebetween, the configuration apparatus comprising:

a processor configured to, upon detecting a media defect in one of the plurality of zones:

determine a width of data tracks in the zone in which the media defect is detected;

calculate a minimum number of contiguous tracks in the zone in which the media defect is detected whose aggregate width is at least as great as the gap between the reader and writer of the head; and margin the detected media defect with a number of tracks immediately adjacent to the detected media defect that is at least equal to the calculated minimum number of contiguous tracks.

14. The configuration apparatus of claim 13, wherein the processor is further configured to margin the detected media defect with the calculated minimum number of contiguous tracks on both an (ID) side and on an (OD) side of the detected media defect.

15. The configuration apparatus of claim 13, wherein the processor is further configured to relocate data stored on the margined tracks to a spare location on the data storage device.

16. The configuration apparatus of claim 13, wherein the processor is configured to determine the width of the data tracks in the zone in which the media defect is detected by:

multiplying a servo tracks per inch (STPI) amount by a ratio of (1) a number of data tracks per cluster (DTPC) in the zone in which the media defect is detected to (2) number of servo tracks per cluster (STPC) in the zone in which the media defect is detected.

17. The configuration apparatus of claim 13, wherein the media defect comprises a thermal asperity (TA).

18. The configuration apparatus of claim 13, wherein the media defect comprises a scratch.

* * * * *